(Model.)
H. C. REGISTER.
ARTIFICIAL TOOTH.
No. 251,460. Patented Dec. 27, 1881.
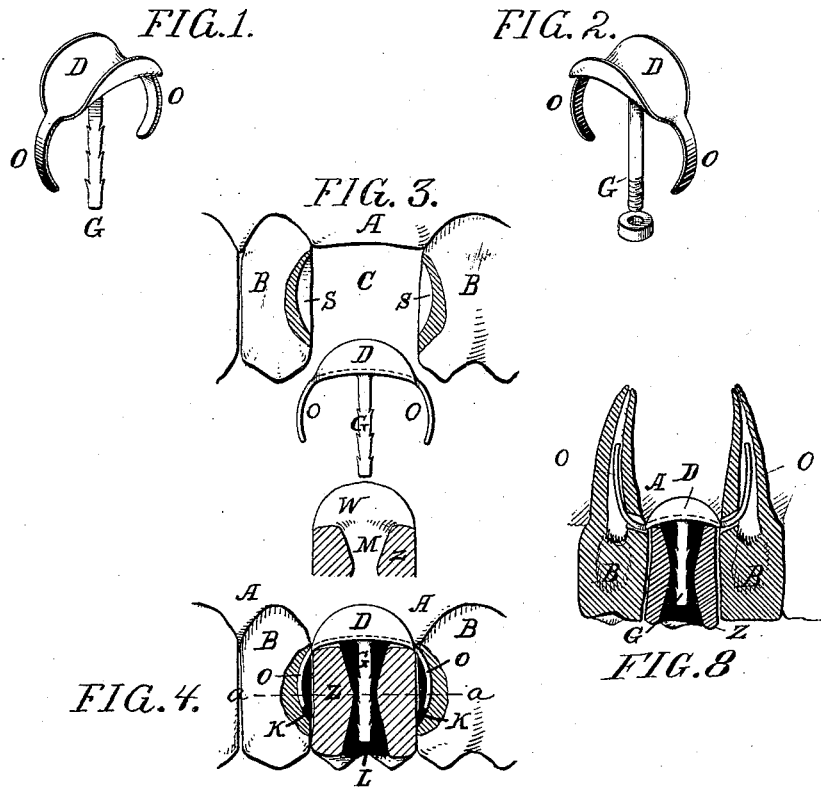
Witnesses,
John K. Rupertus.
Inventor,
Henry C. Register
By his Attorneys,
W. C. Strawbridge
Bonsall Taylor.

UNITED STATES PATENT OFFICE.

HENRY C. REGISTER, OF PHILADELPHIA, PENNSYLVANIA.

ARTIFICIAL TOOTH.

SPECIFICATION forming part of Letters Patent No. 251,460, dated December 27, 1881.

Application filed March 28, 1881. (Model.)

*To all whom it may concern:*

Be it known that I, HENRY C. REGISTER, of Philadelphia, Pennsylvania, have invented an Improvement in Artificial Teeth, of which the following is a specification.

My invention relates to the art of dentistry, and especially to that subdivision of dental practice which is concerned with the repairing or replacing of natural teeth by means of artificial teeth.

It more specifically relates to the replacement of individual natural teeth, whether upper or lower, which happen to have been lost, as opposed to the replacement of an entire upper or lower set, or the major portion thereof.

My invention has for its object the formation of an artificial tooth which can be applied and secured in place through the instrumentality of adjoining natural teeth, and which requires neither a plate upon the hard palate nor one on the front or rear face of the gum.

In the accompanying drawings, Figure 1 represents in perspective a convenient form of what I term a "saddle" or connecting device, whereby the connection of the artificial tooth to the neighboring natural teeth is effected. The stem of the saddle is for convenience barbed. Fig. 2 is a similar view of the same, the stem being threaded and provided with a nut. Fig. 3 is a front elevation of the saddle as about to be applied to the vacant gum or remaining root of a broken natural tooth between two remaining natural teeth, showing also, in central section, the upper portion of a form of artificial tooth invented by me, and which is designed to fit over and to entirely conceal the saddle, which in turn fits over or bridges the gum, being secured to the saddle through the medium of its stem. Fig. 4 is a front elevation of the parts represented in Fig. 3 when the saddle has been set in place upon the gum and the artificial tooth has been cemented to the saddle, said artificial tooth and portions of the two contiguous natural teeth being shown in section. Fig. 5 is a vertical side section through the saddle and artificial tooth when fitted in place in the mouth. Fig. 6 is a top plan view through the stem and bows of the saddle and through the artificial and contiguous natural teeth, taken through said parts on the line *a a* of Fig. 4. Fig. 7 is a view similar to Fig. 4, with the exception that the artificial tooth is held in place by a nut threaded upon the stem of the saddle. Fig. 8 is a central sectional elevation taken on a vertical plane projected through the centers of two natural teeth and of an artificial tooth embodying my invention, which is secured in place by means of a saddle, the bows of which are turned upward and entered into the nerve-cavities of the natural teeth (the vitality of which has been destroyed) through apertures drilled from the interspace diagonally upward into said nerve-cavities.

Similar letters of reference indicate corresponding parts.

In the drawings, A represents a portion of the upper gum of a human mouth; B B, natural teeth; and C, a vacant space between said natural teeth, occasioned by the loss either of the entire natural tooth, root, and crown, or of the crown only of the tooth originally occupying such vacant space.

D is the device by which I secure my artificial tooth in place, and which I term a "saddle." It is well made when of the form shown in the drawings—that is to say, as an elliptical plate having its side portions curved up about its longitudinal axis, so as to present its concavity upward. This shape enables the saddle to bridge over and seat itself upon that portion of the gum from which the natural tooth or teeth have been lost.

Depending from the central under portion of the saddle is a stem, G, which may be roughened or barbed, as shown in Figs. 1, 4, 5, and 8, to enable the readier retention of the cement packing which is applied about it, or may be threaded and provided with a nut, as shown in Figs. 2 and 7.

O are saddle-bows, being metallic arms, forming a part of or attached to the saddle, and being adapted to be extended downwardly therefrom, as shown in Figs. 1, 2, 3, 4, 6, and 7, or upward therefrom, as shown in Fig. 8.

The saddle, stem, and bows are all to be of malleable metal, preferably gold or iridiumized platinum, and to be of light proportions. The saddle, which is the retaining device proper of the artificial tooth, is itself secured in place by means of its bows, which, according to the form of application represented in Figs. 1, 2, 3, 4, 6, and 7, are forced or otherwise entered or fitted into cavities or seats formed in the sides of the natural teeth which are contiguous to the space which it is desired to fill. These cavities or seats for the bows are lettered S, and are made of such shape as to conveniently receive and retain the bows. When the saddle has been entered in place any suitable cement or filling material, K, is employed to effect the rigid retention of the bows within their seats. The saddle can also be secured in place by turning the bows upwardly and entering them within the nerve-cavities of the adjoining natural teeth, which are drilled obliquely into from the cavity, as represented in Fig. 8. This method of attachment of course necessitates the destruction of the vitality of both natural teeth.

The artificial tooth Z is formed of any predetermined exterior configuration, is cored out from top to bottom on the line of its median axis, as at M, and is grooved or channeled transversely across its upper portion, as at W, so as to adapt it to seat itself over the saddle when applied thereto and conceal the same.

In the application of the artificial tooth the stem of the saddle enters within the core of the tooth, as shown in Figs. 4, 5, 7, and 8, and cement or other uniting and filling material L is applied within the core and about the stem, so as to effectuate a solid union between the tooth and stem, and thereby affix the tooth to the saddle. When a barbed stem is employed the core of the artificial tooth is preferably enlarged at both extremities, so as to afford a greater certainty of retention of the tooth in place by preventing any possible loosening of the packing.

Such being a description of my invention in its most simple embodiment, it is obvious that it is of especial applicability to front teeth, although, of course, capable of employment with back teeth, and that, while I have illustrated the application of but a single tooth, the saddle may be extended to such size as to adapt it to receive more than one artificial tooth.

In the use of my artificial tooth the pressure upon it is borne by means of the natural teeth to which the saddle is applied, and to which natural teeth the artificial tooth is rigidly and permanently secured.

Artificial teeth as formed and applied by me require no dental plate upon the hard palate and conceal such small plate or saddle as bridges the gum, while their attachment is effected by means of devices which are entirely concealed from view and are not externally applied upon the adjoining teeth.

I am aware that others before me have attached artificial teeth to continuous bands fitted and cemented to the adjoining natural teeth in such manner as to be supported thereby, and have also attached tapered artificial teeth by wedging them between natural teeth correspondingly tapered, employing a visible gumplate to supplement the attachment, and to neither of such methods of attachment do I lay claim.

Having thus described my invention, I claim—

1. As a new article of manufacture, an artificial tooth transversely grooved or channeled across its upper portion and longitudinally cored out, as and for the purposes specified.

2. An artificial tooth transversely grooved or channeled across its upper portion and longitudinally cored out and supported by concealed attachment to adjoining natural teeth, as and for the purpose specified.

3. In combination with a plate or saddle shaped to bridge and apply itself closely to the human gum, provided with saddle-bows and with one or more stems, and secured in the mouth in the manner hereinbefore described, one or more artificial teeth shaped to bridge, apply themselves closely to, and conceal the saddle, cored to surround the stem or stems, and secured to said stem or stems by cementation or kindred methods, substantially as set forth.

In testimony whereof I have hereunto signed my name this 19th day of March, 1881.

HENRY C. REGISTER.

In presence of—
J. BONSALL TAYLOR,
W. C. STRAWBRIDGE.